US011900905B2

(12) United States Patent
Harada

(10) Patent No.: US 11,900,905 B2
(45) Date of Patent: Feb. 13, 2024

(54) SIGNAL OUTPUT DEVICE

(71) Applicant: YAMAHA CORPORATION, Hamamatsu (JP)

(72) Inventor: Keizo Harada, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 867 days.

(21) Appl. No.: 16/944,239

(22) Filed: Jul. 31, 2020

(65) Prior Publication Data

US 2020/0365128 A1 Nov. 19, 2020

Related U.S. Application Data

(63) Continuation of application No. PCT/JP2018/003797, filed on Feb. 5, 2018.

(51) Int. Cl.
*G10H 3/14* (2006.01)
*G10H 1/32* (2006.01)

(52) U.S. Cl.
CPC ............... *G10H 3/146* (2013.01); *G10H 1/32* (2013.01)

(58) Field of Classification Search
CPC .......... G10D 13/00; G10D 13/02; G10H 1/32; G10H 3/00; G10H 3/12; G10H 3/14; G10H 3/146
See application file for complete search history.

(56) References Cited

U.S. PATENT DOCUMENTS 4,168,647 A 9/1979 Petillo
4,570,522 A 2/1986 May
5,134,920 A 8/1992 Clark
7,214,871 B2 * 5/2007 Hasenmaier ........... G10H 3/146 84/723
7,446,255 B2 11/2008 Yamaya
8,121,300 B1 2/2012 Loduca
2004/0134332 A1 7/2004 Kamijima
2005/0087062 A1 4/2005 Kiyohiko
(Continued)

FOREIGN PATENT DOCUMENTS

DE 29518362 U1 3/1997
GB 1224055 A 3/1971
(Continued)

OTHER PUBLICATIONS

English translation of Written Opinion issued in Intl. Appln. No. PCT/JP2018/003797 dated Mar. 27, 2018, previously cited in IDS filed Jul. 31, 2020.
(Continued)

*Primary Examiner* — Nguyen Q. Ha
(74) *Attorney, Agent, or Firm* — ROSSI, KIMMS & McDOWELL LLP

(57) ABSTRACT

A signal output device comprising a housing, a fastener that attaches the housing to an object that includes a portion to be struck, an arm section attached to the housing, an extension section extending from the arm section and configured to contact the portion to be struck, a first sensor that detects vibration transmitted to the arm section and outputs a vibration signal representing the vibration, a second sensor provided on the housing and that detects vibration transmitted to the housing, and an output terminal that outputs the vibration detected by at least one of the first sensor or the second sensor.

14 Claims, 9 Drawing Sheets

(56) References Cited

U.S. PATENT DOCUMENTS

| | | | | |
|---|---|---|---|---|
| 2007/0137460 | A1 | 6/2007 | Mori | |
| 2014/0301589 | A1 | 10/2014 | Greenwood | |
| 2016/0093278 | A1 | 3/2016 | Esparza | |
| 2017/0311065 | A1 | 10/2017 | Takehisa | |
| 2019/0221199 | A1* | 7/2019 | Nomura | H04R 1/46 |

FOREIGN PATENT DOCUMENTS

| | | | |
|---|---|---|---|
| JP | H04502215 | A | 4/1992 |
| JP | 2006047946 | A | 2/2006 |
| JP | 2007171233 | A | 7/2007 |
| JP | 2010134341 | A | 6/2010 |
| JP | 2012208487 | A | 10/2012 |
| JP | 2017195512 | A | 10/2017 |
| JP | 2017532614 | A | 11/2017 |
| WO | 9003639 | A1 | 4/1990 |

OTHER PUBLICATIONS

Office Action issued in Chinese Appln. No. 201880088521.3 dated Jan. 31, 2023. English machine translation provided.

Office Action issued in European Appln. No. 18903521.5 dated Apr. 5, 2023.

Office Action issued in Japanese Appln. No. 2019-568544 dated Jun. 15, 2021.English translation provided.

Extended European search report issued in European Appln. No. 18903521.5 dated Aug. 6, 2021.

International Search Report issued in Intl. Appln. No. PCT/JP2018/003797 dated Mar. 27, 2018. English translation provided.

Written Opinion issued in Intl. Appln. No. PCT/JP2018/003797 mailed Mar. 27, 2018.

* cited by examiner

SIGNAL OUTPUT DEVICE

CROSS-REFERENCE TO RELATED APPLICATIONS

This application is a U.S. continuation application filed under 35 U.S.C. § 111(a), of International Application No. PCT/JP2018/003797, filed on Feb. 5, 2018, the disclosures of which are incorporated by reference.

FIELD

The present invention relates to a signal output device that generates a signal based on vibration applied to a drumhead.

BACKGROUND

In an electronic drum or a muffled acoustic drum, a sound is output from a sound source based on vibration due to a beat applied to a head. A drum trigger including a sensor such as a piezoelectric sensor is installed on the head, and vibration to be applied to the head is sensed by the drum trigger. For example, Japanese laid-open patent publication No. 2007-171233 discloses an electric percussion instrument in which a plurality of vibration pickups are provided on a resonance plate mounted on an attachment section to the percussion instrument to detect vibration applied to the percussion instrument. Japanese laid-open patent publication No. 2010-134341 discloses an electric percussion instrument in which a plurality of vibration pickups are provided on a metal plate provided with an attachment arm. Japanese laid-open patent publication No. 2012-208487 discloses a sheet-shaped piezoelectric sensor having flexibility contacting a drumhead of a percussion instrument.

SUMMARY

A signal output device according to an aspect of the present invention includes a housing, a fastener that attaches the housing to an object that includes a portion to be struck, an arm section attached to the housing, an extension section extending from the arm section and configured to contact the portion to be struck, a first sensor that detects vibration transmitted to the arm section and outputs a vibration signal representing the vibration, a second sensor provided on the housing and that detects vibration transmitted to the housing, and output terminal that outputs the vibration detected by at least one of the first sensor or the second sensor.

A signal output device according to an aspect of the present invention includes a housing, a fastener that attaches the housing to an object that includes a portion to be struck, an arm section attached to the housing and configured to be rotatable with respect to the housing about a rotation axis, an extension section extending from the arm section and configured to contact the portion to be struck, and a sensor that detects vibration transmitted to the arm section and outputs a vibration signal representing the vibration, in which the extension extends substantially at a right angle to the rotation axis.

A signal output device according to an aspect of the present invention includes a housing, a fastener that attaches the housing to an object that includes a portion to be struck, an arm section attached to the housing, an extension section extending from the arm section and configured to contact the portion to be struck, and a first sensor that detects vibration transmitted to the arm section and outputs a vibration signal representing the vibration, in which the arm section is configured to be extendable and retractable with respect to the housing.

DESCRIPTION OF EMBODIMENTS

Figure 1:
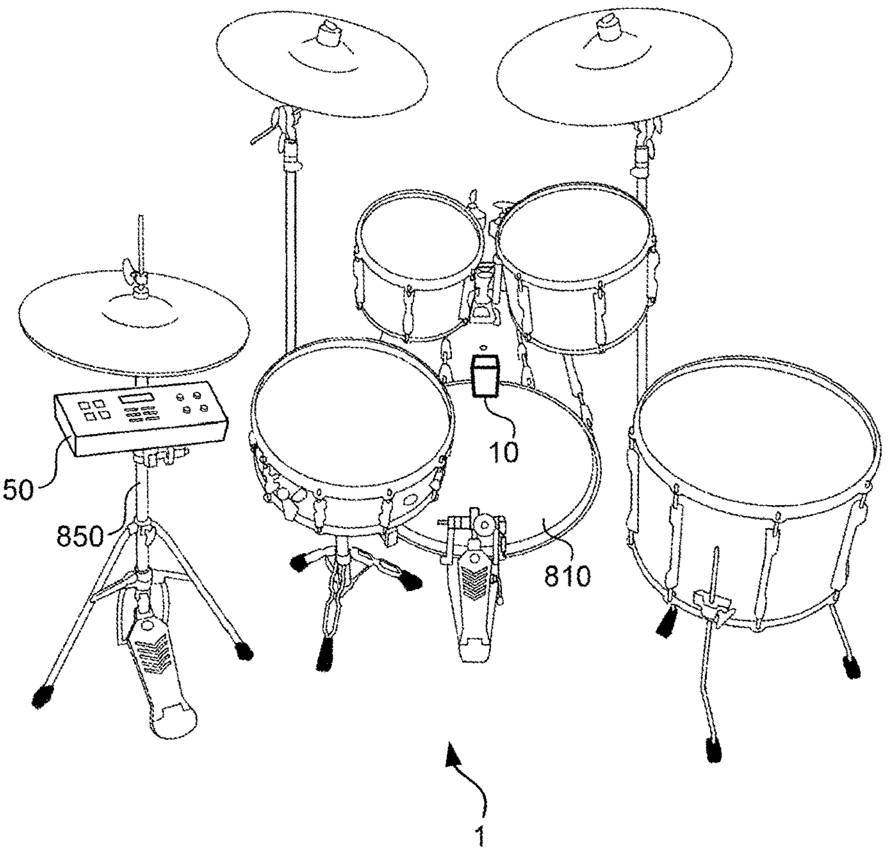
FIG. 1 is a diagram for describing an installation position of a signal output device according to a first embodiment of the present invention on a drum set.

A drum trigger capable of more efficiently detecting vibration applied to a percussion instrument has been required.

According to the present invention, a signal output device that more efficiently detects vibration applied to a drumhead and generates a signal corresponding to the detected vibration is provided.

A signal output device according to an embodiment of the present invention will be described in detail below with reference to the drawings. Embodiments described below are respectively examples of embodiments of the present invention, and the present invention is not construed as being limited to the embodiments. In the drawings referred to in the embodiments, identical sections or units or sections or units having similar functions are respectively assigned identical or similar reference signs (numerals only followed by A, B, etc.), and its repetitive description may be omitted. A dimensional ratio (a ratio among components, a ratio between vertical and horizontal height directions, etc.) in the drawings may differ from an actual ratio for convenience of illustration, or some of components may be omitted from the drawings.

First Embodiment

Outline of Signal Output Device

The outline of a signal output device according to a first embodiment of the present invention will be described. In this example, the signal output device is used to be attached to a drum set, and detects vibration to be applied to a head to convert the vibration into a vibration signal and output the vibration signal. The vibration signal output from the signal output device represents vibration applied to the head. The vibration signal functions as a trigger indicating that vibration has been applied to the head.

FIG. 1 is a diagram for describing an installation position of the signal output device according to the first embodiment of the present invention on a drum set 1. The signal output device 10 according to the first embodiment is installed on a bass drum 810. At this time, the signal output device 10 is configured to be detachably attached to the bass drum 810. A vibration signal generated by the signal output device 10 is transmitted to a control device 50.

Figure 2:
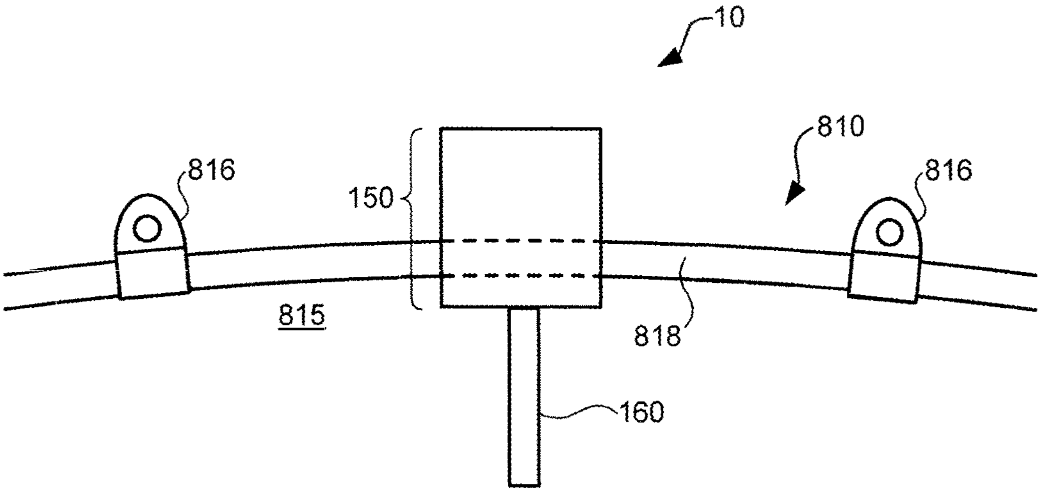
FIG. 2 is a diagram for describing an installation position of the signal output device according to the first embodiment of the present invention.

FIG. 2 is a diagram for describing an installation position of the signal output device in the first embodiment of the present invention. FIG. 2 is a diagram illustrating the signal output device 10 as viewed from the front. In the following description, a front surface of the signal output device 10 means a surface directed toward a player of a drum set when the signal output device 10 is installed on the drum set (when the signal output device 10 is installed on an upper part of the bass drum 810), as described below. An upper surface, a lower surface, a back surface, and a side surface of the signal output device 10 are respectively surfaces indicated using the front surface of the signal output device 10 as a reference. The upper surface side, the lower surface side, the right side surface side, and the left side surface side are respectively defined as "upper", "lower", "right", and "left" when the signal output device 10, which remains installed on the drum set, is viewed from the front. The signal output device 10 is installed on the vicinity of the center in the upper part of the bass drum 810. In FIG. 2, the signal output device 10 is installed so as to sandwich a rim (support section) 818 supporting a head (which may be hereinafter referred to as a drumhead 815) which is a portion to be struck of the bass drum 810 between adjacent lugs 816. A specific configuration will be described below.

A housing 150 is arranged on the front surface side of the signal output device 10. The housing 150 is formed of a material capable of protecting each of portions inside thereof even if accidentally struck by a drum stick by a player, e.g., a metal such as stainless or plastic. The housing 150 is provided with an arm section 160 extending from the housing 150. The arm section 160 is attached to the housing 150 by an attachment section, descried below. The arm section 160 extends toward the drumhead 815 of the bass drum 810 with respect to the rim 818.

Referring to FIG. 1 again, description is continued. The signal output device 10 generates and outputs a vibration signal corresponding to vibration applied to the drumhead 815 of the bass drum 810 in a place where it is installed.

The control device 50 is installed on a high-hat stand 850 in an example illustrated in FIG. 1. The control device 50 generates a sound signal based on an input signal, and provides an acoustic effect to the sound signal. In the present embodiment, the control device 50 generates a sound signal based on the vibration signal output from the signal output device 10. The control device 50 also provides an acoustic effect to the generated sound signal and outputs the sound signal. The player listens to the sound signal to be output from the control device 50 with a sound radiation device such as a headphone. As a result, the player can listen to a sound corresponding to a performance.

The signal output device 10 and the control device 50 are connected to each other by wire using a cable or the like in the present embodiment. However, the connection between the signal output device 10 and the control device 50 is not limited to wired connection, but the signal output device 10 and the control device 50 may be wirelessly connected to each other. Connection between the control device 50 and the sound radiation device may also be wired connection or wireless connection.

Structure of Signal Output Device

Figure 3:
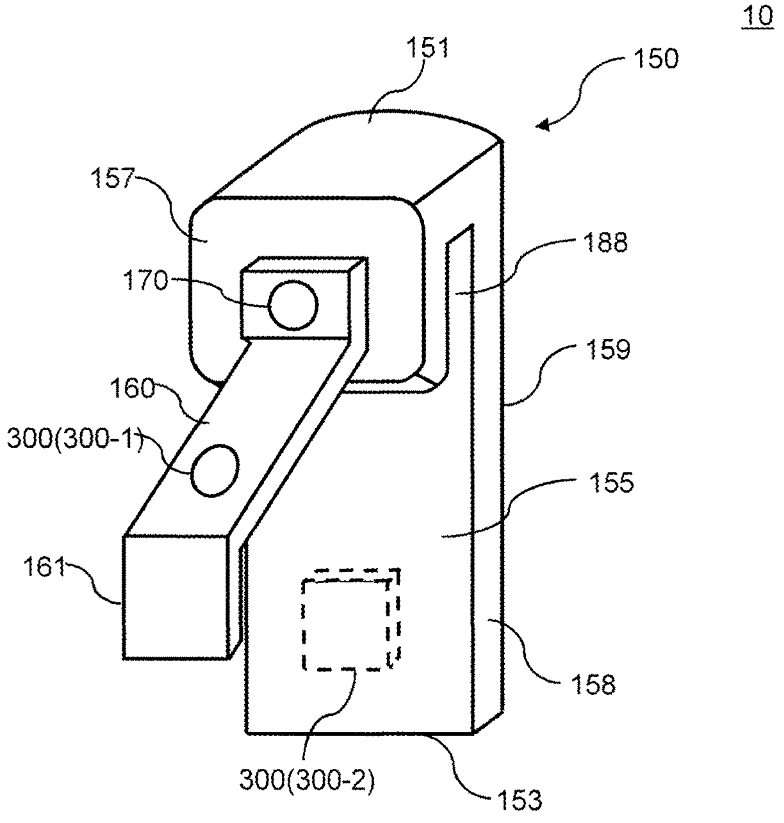
FIG. 3 is a perspective view of the signal output device according to the first embodiment of the present invention.
Figure 4:
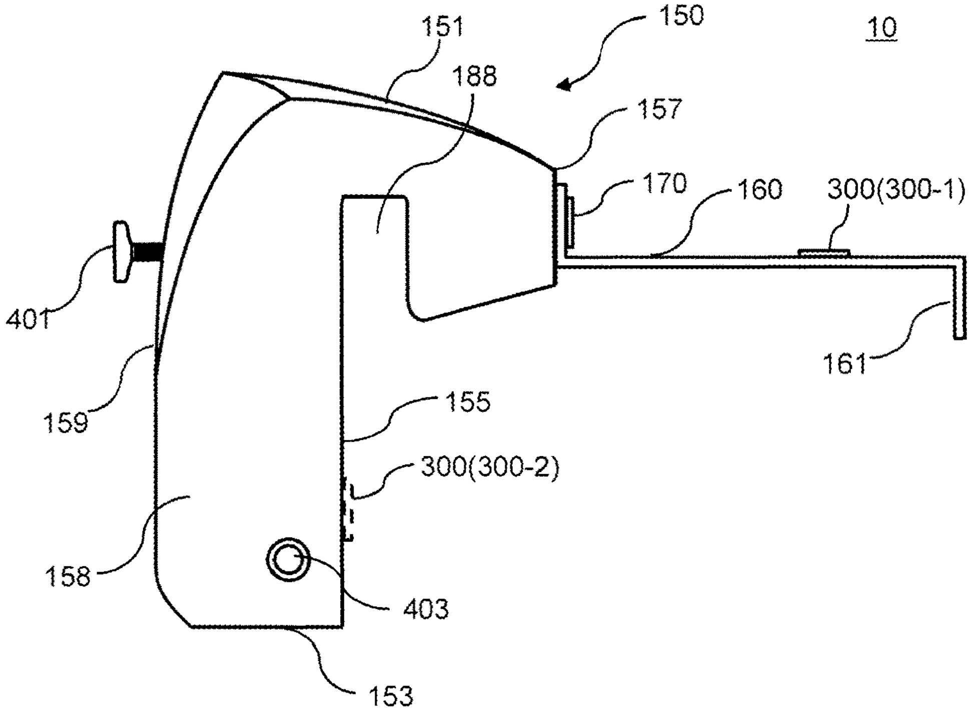
FIG. 4 is a diagram illustrating the signal output device according to the first embodiment of the present invention viewed from the left side.
Figure 5:
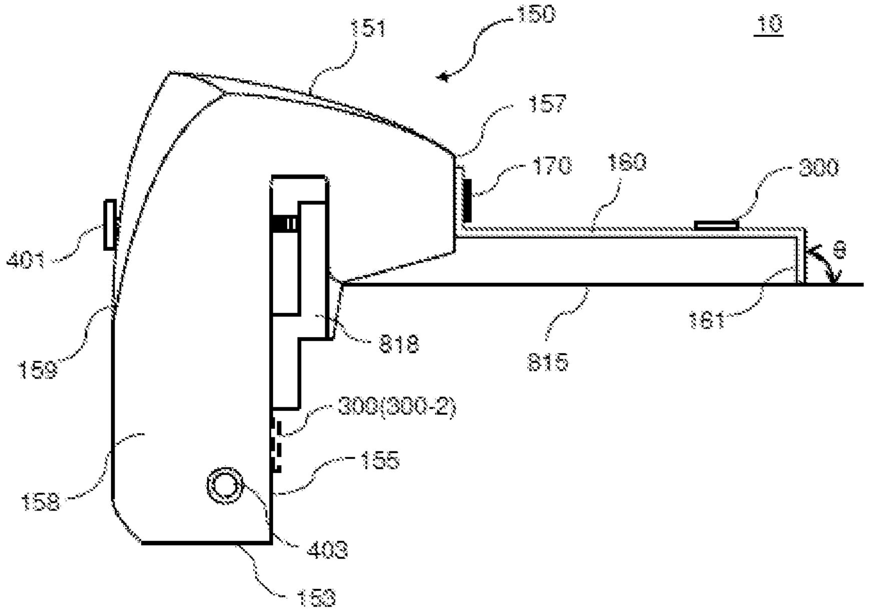
FIG. 5 is a diagram illustrating the signal output device according to the first embodiment of the present invention attached to a bass drum as viewed from the left side.

Then, a specific structure of the signal output device 10 will be described. FIG. 3 is a perspective view of the signal output device 10 according to the first embodiment of the present invention. FIG. 4 is a diagram illustrating the signal output device 10 according to the first embodiment of the present invention viewed from the left side. FIG. 5 is a diagram illustrating the signal output device 10 according to the first embodiment of the present invention attached to the bass drum 810 as viewed from the left side.

The housing 150 includes an upper region 151, a lower region 153, an intermediate region 155, a front region 157, a side region 158, and a back region 159. The regions are directly or indirectly connected to one another, and a positional relationship thereamong is fixed. The upper region 151 corresponds to a region arranged on the upper surface side of the housing 150 and a region above a position where the rim 818 is attached. The lower region 153 corresponds to a region arranged on the lower surface side of the housing 150 and a region below the position where the rim 818 is attached. The intermediate region 155 connects the front region 157 and the lower region 153 to each other. In the intermediate region 155, a recessed region 188 is provided. The recessed region 188 has an opening on the side of the lower region 153. The rim 818 is inserted into the recessed region 188 from the opening (from the back surface side).

The front region 157 corresponds to a region on the front surface side of the housing 150. The back region 159 corresponds to a region on the back surface side of the housing 150, and connects the upper region 151 and the lower region 153 to each other. The side region 158 connects the upper region 151, the lower region 153, the intermediate region 155, the front region 157, and the back region 159 to one another on the respective side surface sides of the regions.

The arm section 160 is attached to the front region 157 by an attachment section 170. For example, the attachment section 170 is a screw. A nut may be embedded in the front region 157. As illustrated in FIG. 2, the arm section 160 extends toward the drumhead 815 of the bass drum 810 with respect to the rim 818. In the present embodiment, the arm section 160 extends parallel to the drumhead 815 of the bass drum 810. The arm section 160 is provided with an extension section 161 extending from the arm section 160 to contact the drumhead 815 of the bass drum 810. At least one sensor 300 (300-1), which detects vibration applied to the drumhead 815 of the bass drum 810, is arranged on the arm section 160.

The extension section 161 contacts the drumhead 815 of the bass drum 810. At this time, an angle θ formed between an extension direction of the extension section 161 and the drumhead 815 is preferably a substantially right angle. The vibration applied to the drumhead 815 of the bass drum 810 is transmitted to the arm section 160 through the extension section 161. The sensor 300 (300-1) provided on the arm section 160 detects the vibration transmitted to the arm section 160.

The back region 159 is provided with a fixing screw (fastener) 401. When the fixing screw 401 is rotated, a part of a shaft of the fixing screw 401 protrudes toward the intermediate region 155. The rim 818 inserted into the recessed region 188 is sandwiched and fixed between the part of the shaft of the fixing screw 401 and the housing 150. As a result, the housing 150 is fixed to the rim 818.

The sensor 300 (300-1) is arranged on the arm section 160 in the present embodiment. As described above, the vibration in the bass drum 810 is transmitted to the sensor 300 (300-1) via the extension section 161 and the arm section 160. The sensor 300 (300-1) detects the transmitted vibration, and outputs a vibration signal corresponding to the detected vibration. The vibration signal represents the timing and the magnitude of the vibration detected by the sensor 300 (300-1). The vibration signal may be waveform data representing the timing and the magnitude of the detected vibration. The vibration signal may be amplified by an amplification circuit not illustrated and output.

In the present embodiment, an example in which the sensor 300 (300-1) is provided on the arm section 160 is described. However, the sensor 300 (300-1) may be arranged on the extension section 161 or the side region 158, the intermediate region 155, or the lower region 153 of the housing 150. The sensor 300 (300-1) may be arranged within the housing 150. The number of sensors 300 (300-1) is not limited to one. Two or more sensors 300 may be provided. If a plurality of sensors 300 are provided, the plurality of sensors 300 may be arranged at the same position or may be respectively arranged at different positions. If two sensors are used, for example, the one sensor 300 (300-1) may be arranged on the arm section 160, and the other sensor 300 (300-2) may be arranged on/in the housing 150. The other sensor 300 (300-2) may detect vibration to be transmitted through the arm section 160. The other sensor 300 (300-2) may detect vibration to be transmitted to the housing 150 from a hoop of the bass drum 810 via the recessed region 188. In FIG. 3, an example in which the sensor 300 (300-2) is arranged in the intermediate region 155 of the housing 150 is illustrated. If the bass drum 810 and the intermediate region 155 directly contact each other, the sensor 300 (300-2) may detect vibration to be transmitted to the intermediate region 155. An arrangement position of the sensor 300 (300-2) is not limited to the intermediate region 155. The sensor 300 (300-2) may be arranged within the housing 150. The sensor 300 (300-2) may be installed with the housing 150 using an adhesive agent.

Figure 6:
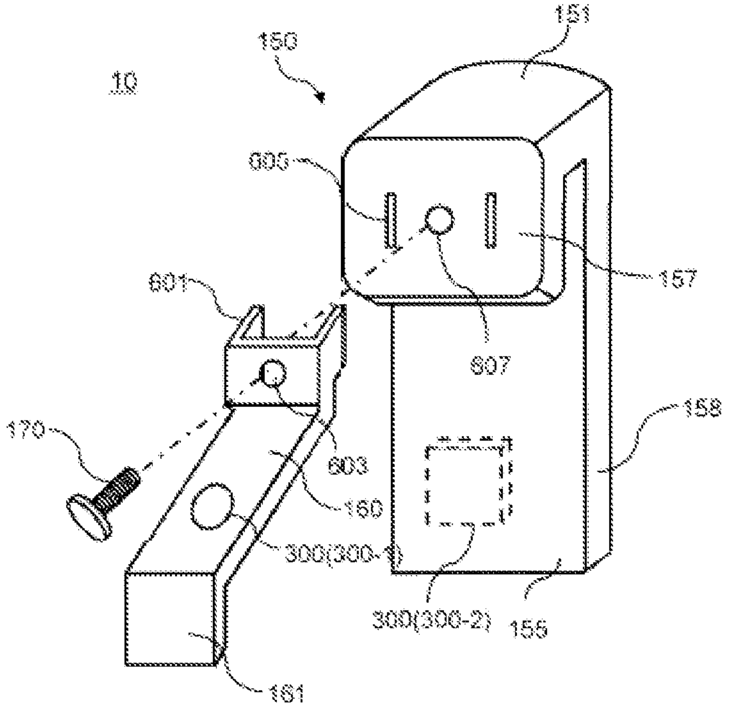
FIG. 6 is a perspective view illustrating the signal output device according to the first embodiment of the present invention when an arm section is detached from a housing.

In the present embodiment, the arm section 160 attached to the housing 150 is detachable. FIG. 6 is a perspective view illustrating the signal output device 160 when the arm section 160 is detached from the housing 150. As described above, the arm section 160 is attached to the housing 150 by the attachment section 170. The attachment section 170 is a screw. Accordingly, when the attachment section 170 is detached from the housing 150, the housing 150 and the arm section 160 can be detached from each other.

The arm section 160 is provided with a protrusion section 601 and a hole 603 into which the attachment section 170 is to be inserted. The front region 157 of the housing 150 is provided with an opening 605 and a hole 607 into which the attachment section 170 is to be inserted. A nut is embedded in the hole 607. When the arm section 160 is attached to the housing 150, the protrusion section 601 provided in the arm section 160 is inserted into the opening 605 provided in the front region 157 of the housing 150. The attachment section 170 is inserted into the hole 603 and the hole 607, and the attachment section 170 is rotated, to screw and fix the arm section 160 to the housing 150.

Although a case where the protrusion section 601 provided with the arm section 160 is inserted into the opening 605 provided in the front region 157 of the housing 150, to screw and fix the arm section 160 to the housing 160 has been described as an example in the present embodiment, a terminal may be provided with the front region 157 of the housing 150 instead of the opening 605. The arm section 160 may be fixed to the housing 150 by being inserted the arm section 160 into the terminal.

The side region 158 of the housing 150 is provided with an output terminal 403. A plug of a cable (not illustrated) or the like is inserted into the output terminal 403. The cable electrically connects the signal output device 10 and the control device 50 to each other. The output terminal 403 is preferably provided at a position where the cable does not contact the drumhead 815 of the bass drum 810. The vibration signal output from the sensor 300 (300-1) is transmitted to the control device 50 via the cable connected to the output terminal 403. If a plurality of sensors 300 are provided, a vibration signal output from at least one of the sensors is transmitted to the control device 50 via the cable.

Figure 7:
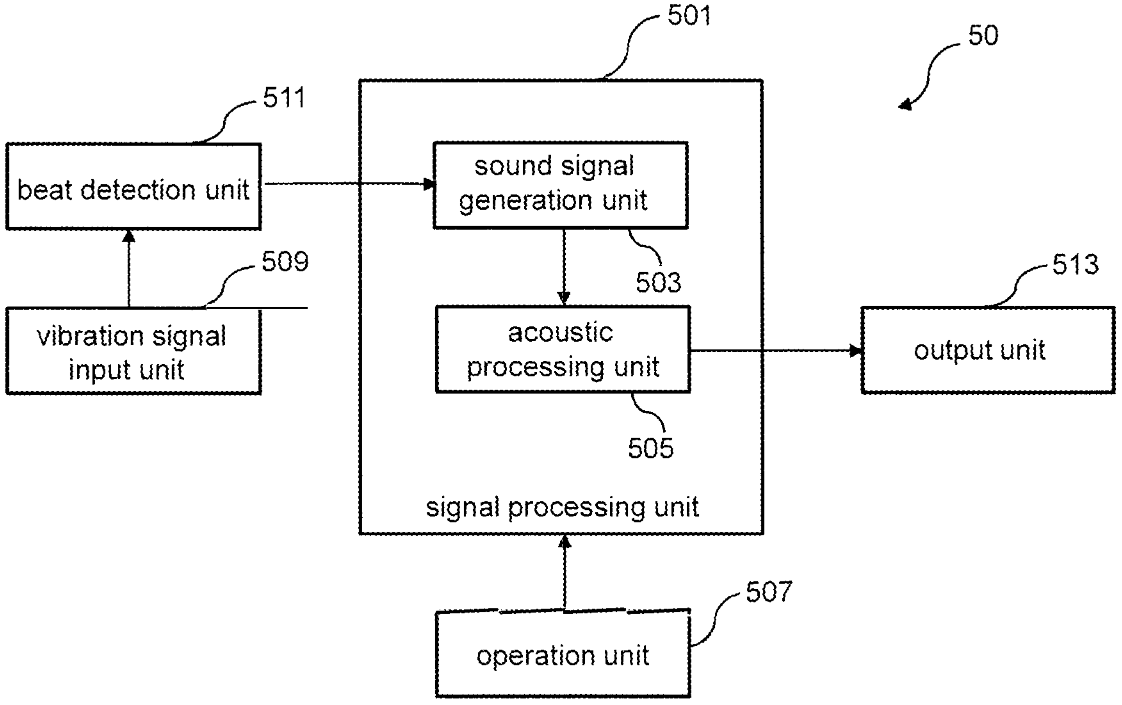
FIG. 7 is a block diagram illustrating a configuration of a control device in the first embodiment of the present invention.

FIG. 7 is a block diagram illustrating a configuration of the control device 50. The control device 50 includes a signal processing unit 501, an output unit 513, an operation unit 507, a beat detection unit 511, and a vibration signal input unit 509.

The vibration signal input unit 509 is a terminal to which an external device is connected via a cable or the like. In this example, the signal output device 10 is connected to the vibration signal input unit 509, and a vibration signal to be output from the signal output device 10 is input to the vibration signal input unit 509. The vibration signal input unit 509 outputs the input vibration signal to the beat detection unit 511.

The beat detection unit 511 detects the timing and the strength of a beat on the drumhead 815 of the bass drum 810 based on a vibration waveform represented by the vibration signal input from the vibration signal input unit 509. The timing of the beat may be a timing at which the amplitude of the vibration waveform exceeds a previously determined threshold value, for example. A peak value of the amplitude within a predetermined time period from the timing at which the amplitude exceeds the threshold value may be the strength of the beat. The beat detection unit 511 detects the strength of the beat when the timing of the beat is detected, and outputs a beat signal representing the strength to the signal processing unit 501. For example, the beat signal may be a signal in an MIDI format, and includes note-on and velocity in this case.

The signal processing unit 501 includes a sound signal generation unit 503 and an acoustic processing unit 505. The sound signal generation unit 503 generates a sound signal based on the beat signal output from the beat detection unit 511. The sound signal is generated using a sound waveform previously registered, for example, is generated by reading out a waveform obtained by recording a drumbeat of the bass drum from a memory. A plurality of types of waveforms may be registered in the memory, and a desired tone of the user may be selected by an operation of the operation unit 507.

The acoustic processing unit 505 provides an acoustic effect (e.g., reverb, delay, distortion, or compressor) corresponding to a set parameter to the sound signal input from the sound signal generation unit 503 and outputs the sound signal. The parameter may be a previously determined value, or may be a value input via the operation unit 507. The operation unit 507 is a device that receives input of an instruction by a user, e.g., a button, a knob, or a touch panel. If there are a plurality of parameters to be set, a combination of values to be respectively set for the parameters may be stored as a template, and the template to be set may be switched by operating the knob or the like. The operation unit 507 may be an external device connected to the control device 50. A pad or a foot switch used in an electronic drum or the like, for example, may be used as the external device. If the foot switch or the like is used, a tempo may be calculated from an operation interval, and a predetermined parameter (e.g., delay time) may be changed depending on the tempo. The control device 50 may calculate the tempo based on the sound signal acquired from the signal output device 10. The control device 50 may be operable by a personal computer, a smartphone, or the like.

The output unit 513 is a terminal to which an external device is connected via the cable or the like, and the external device is connected to the output unit 513 via the cable or the like. The output unit 513 outputs the sound signal output from the acoustic processing unit 505. The sound signal is fed to the external device (e.g., a headphone) connected to the output unit 513. As a result, a player of the drum set can listen to a sound generated based on a beat of the bass drum 810 using the sound radiation (external) device such as the headphone.

As described above, in the present embodiment, the extension section 161 extending from the arm section 160 of the signal output device 10 directly contacts the drumhead (portion to be struck) 815 of the bass drum 810. Accordingly, the sensor 300 can efficiently detect vibration transmitted to the arm section 160. An angle formed between an extension direction of the extension section 161 and the drumhead 815 of the bass drum 810 is a substantially right angle. Thus, sufficient vibration is transmitted to the extension section 161 from the drumhead 815, resulting in an improved detection accuracy of the sensor 300.

Further, in the present embodiment, the arm section 160 is detachable from the housing 150. Accordingly, if detection of vibration to be applied to the drumhead 815 is not required, the user can easily detach the arm section 160 from the housing 150.

In the present embodiment, attachment and detachment between the arm section 160 and the housing 150 may correspond to electrical connection and electrical disconnection between the arm section 160 and the housing 150. That is, an attachment/detachment mechanism between the arm section 160 and the housing 150 may also serve as an electrical connection section between the arm section 160 and the housing 150. Although a case where the signal output device 10 is attached to the rim 818 has been described in the present embodiment, an attachment position of the signal output device 10 is not limited to the rim 818. For example, the signal output device 10 can also be fixed to the lugs of the drum.

Second Embodiment

The signal output device according to the first embodiment described above has a configuration in which the arm section provided with the sensor is detachable from the housing. Accordingly, the user can detach the arm section from the housing, as needed. In a second embodiment, a signal output device capable of changing a position of an arm section without detaching an arm section from a housing will be described.

Figure 8:
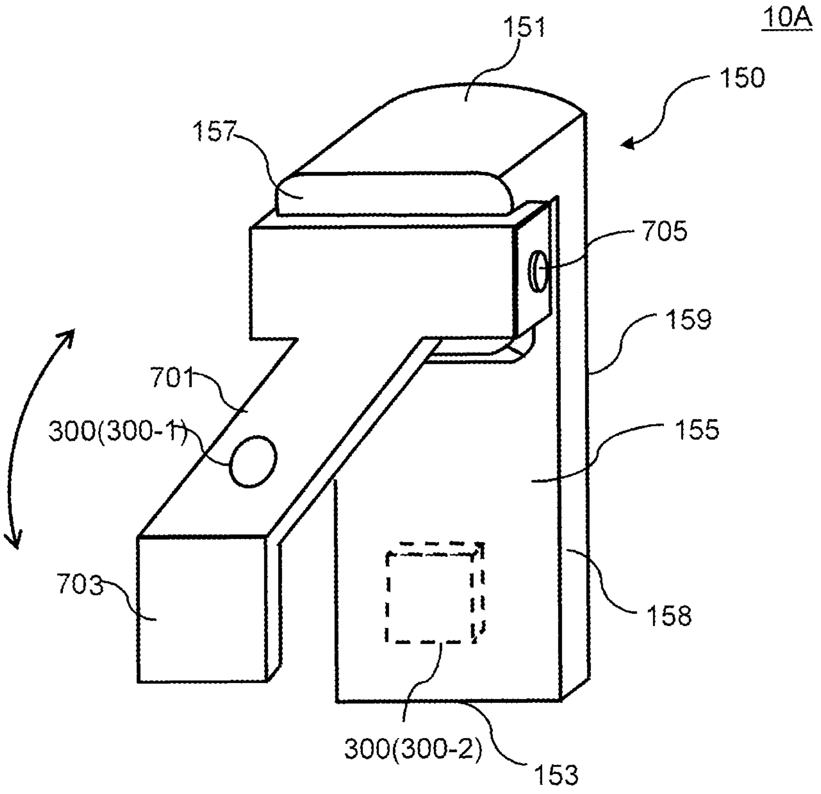
FIG. 8 is a perspective view of a signal output device according to a second embodiment of the present invention.
Figure 9:
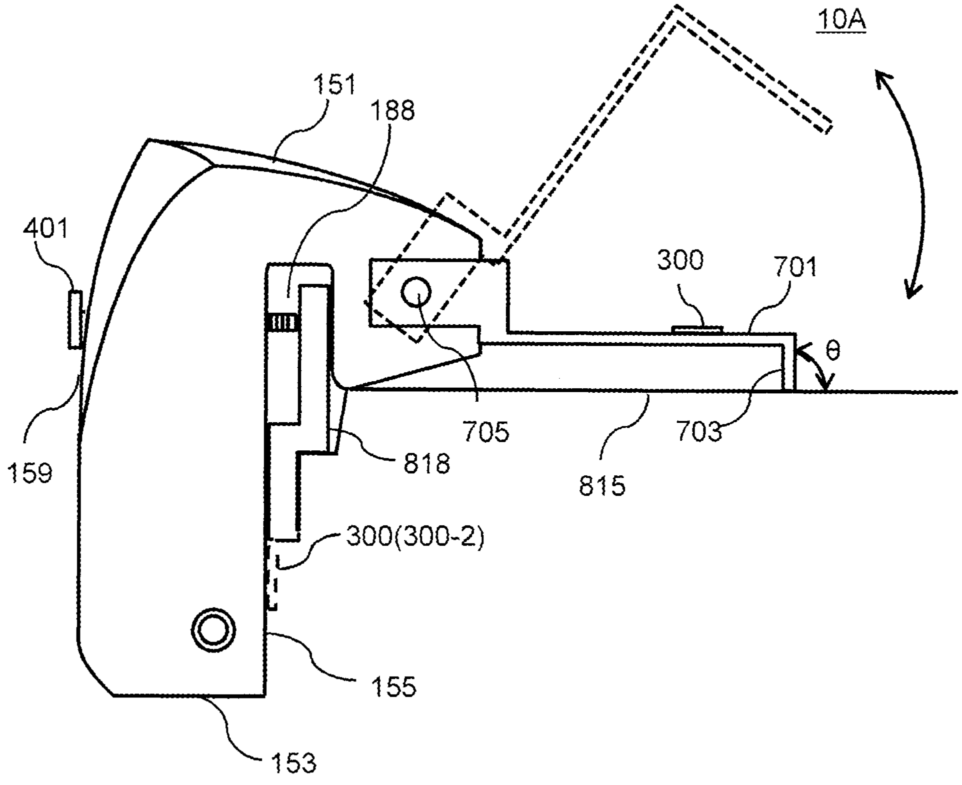
FIG. 9 is a diagram illustrating the signal output device according to the second embodiment of the present invention attached to a bass drum as viewed from the left side.

FIG. 8 is a perspective view of a signal output device 10A according to the second embodiment of the present invention. FIG. 9 is a diagram illustrating the signal output device 10A according to the second embodiment of the present invention attached to a bass drum 810 as viewed from the left side. The signal output device 10A according to the present embodiment has substantially the same configuration as that of the signal output device 10 according to the first embodiment except that an arm section 701 is rotatably attached to a housing 150, as described below. A different configuration from that of the signal output device 10 according to the first embodiment will be mainly described below, and detailed description is omitted for the same configuration as the configuration of the signal output device 10 according to the first embodiment.

The arm section 701 is rotatably attached to the housing 150 by an attachment section 705. As illustrated in FIG. 8 and FIG. 9, the arm section 701 is fixed to the housing 150 by the attachment section 705 in a side region 158 adjacent to a front region 157 of the housing 150. The side region 158 adjacent to the front region 157 is provided with the attachment section 705 on a right side surface of the housing 150, which is not illustrated. The attachment section 705 may be a double-threaded screw shaft having male screws provided at both its ends, for example. In this case, a shaft portion of the attachment section 705 is arranged within the housing 150. The arm section 701 turns up and down with the attachment section 705 used as an axis.

In the present embodiment, a sensor 300 (300-1) is arranged in the arm section 701, like in the first embodiment. However, a position where the sensor 300 (300-1) is arranged is not limited to the arm section 701. The sensor 300 (300-1) may be arranged on an extension section 703 extending from the arm section 701. The extension section 703 contacts a drumhead 815 of a bass drum 810, which is not illustrated. At this time, an angle θ formed between an extension direction of the extension section 703 and the drumhead 815 is preferably a substantially right angle. Vibration applied to the drumhead 815 of the bass drum 810 is transmitted to the arm section 701 through the extension section 703. The sensor 300 (300-1) provided on the arm section 701 detects the vibration transmitted to the arm section 701.

In the present embodiment, the extension section 703 extending from the arm section 701 of the signal output device 10A directly contacts the drumhead 815 of the bass drum 810, like in the first embodiment. Thus, the sensor 300 (300-1) can efficiently detect vibration transmitted to the arm section 701. The angle formed between the extension direction of the extension section 703 and the drumhead 815 of the bass drum 810 is a substantially right angle. Thus, sufficient vibration is transmitted to the extension section 703 from the drumhead 815, resulting in an improved detection accuracy of the sensor 300 (300-1). Further, in the present embodiment, the arm section 701 is rotatably attached to the housing 150. Accordingly, if detection of vibration to be applied to the drumhead 815 is not required, a user may move the arm section 701 in an upward direction opposite to the extension direction of the extension section 703. Since the arm section 701 rotates relative to the housing 150 with the attachment section 705 used as an axis, the arm section 701 can be easily separated from the drumhead 815 without being detached from the housing 150.

Although an example in which the sensor 300 (300-1) is provided on the arm section 701 has been described in the present embodiment, the sensor 300 (300-1) may be arranged on the extension section 703 or the side region 158, an intermediate region 155, or a lower region 153 of the housing 150. The sensor 300 (300-1) may be arranged within the housing 150. The number of sensors is not limited to one. Two or more sensors may be provided. If a plurality of sensors are provided, the plurality of sensors may be arranged on/in the same position or may be respectively arranged on/in different positions. If two sensors are used, for example, the one sensor 300 (300-1) may be arranged on the arm section 701, and the other sensor 300 (300-2) may be arranged on the intermediate region 155 of the housing 150, as illustrated in FIG. 8.

Third Embodiment

Figure 10A:
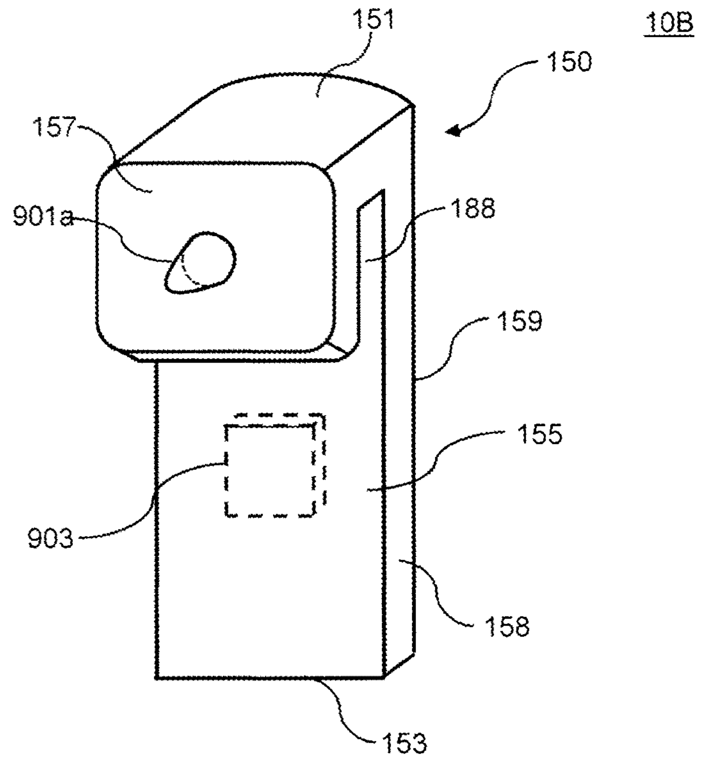
FIG. 10A is a perspective view of a signal output device according to a third embodiment of the present invention.
Figure 10B:
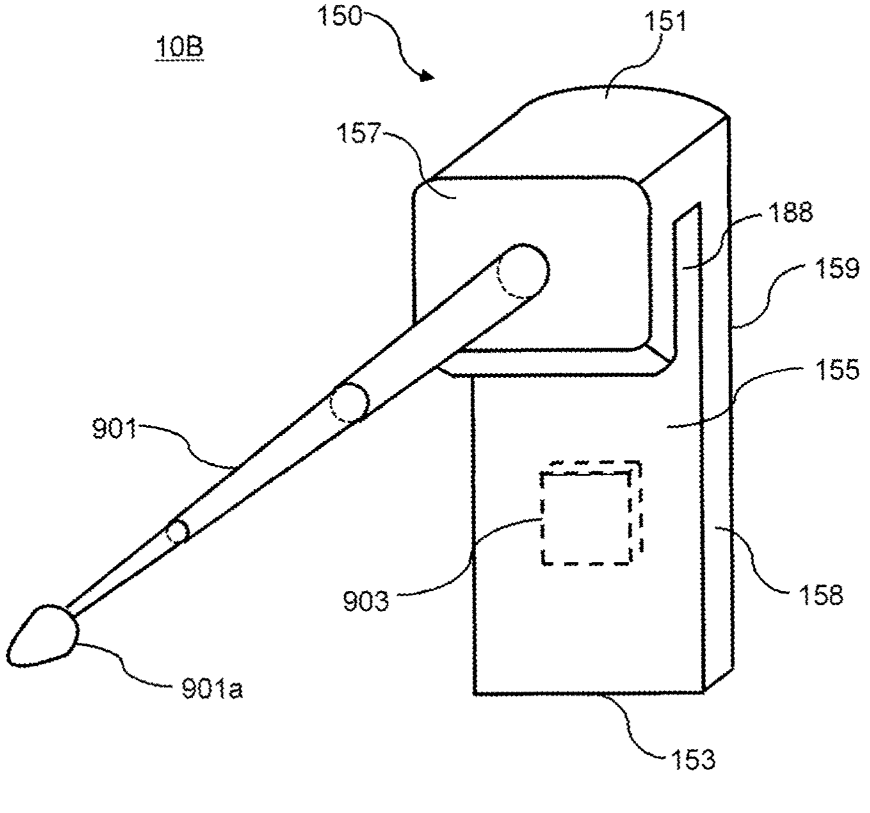
FIG. 10B is a perspective view of the signal output device according to the third embodiment of the present invention.

FIG. 10A and FIG. 10B are perspective views of a signal output device 10B according to a third embodiment of the present invention. The signal output device 10B according to the present embodiment has substantially the same configuration as that of the signal output device 10 according to the first embodiment except that an arm section 901 is extendably and retractably attached to a housing 150, as described below. A different configuration from that of the signal output device 10 according to the first embodiment will be mainly described below, and detailed description is omitted for the same configuration as the configuration of the signal output device 10 according to the first embodiment.

As illustrated in FIG. 10A and FIG. 10B, the arm section 901 has a telescopic extension/retraction mechanism in the present embodiment. If detection of vibration to be applied to a drumhead of a bass drum (not illustrated) is not required, the arm section 901, excluding the distal end portion 901*a* of the arm section 901, is housed within the housing 150 by reducing the length thereof, as illustrated in FIG. 10A. On the other hand, if the vibration to be applied to the drumhead of the bass drum (not illustrated) is detected, the arm section 901 is extended. The distal end portion 901*a* of the arm section 901 contacts the drumhead of the bass drum (not illustrated).

In the present embodiment, a sensor 903 is provided within the housing 150. The sensor 903 detects the vibration transmitted to the arm section 901 from the drumhead of the bass drum. A position where the sensor 903 is arranged is not limited to the inside of the housing 150. The sensor 903 may be arranged on the arm section 901 and the distal end portion 901*a* of the arm section 901. A plurality of sensors 903 may be provided in the signal output device 10B. If the plurality of sensors 903 are provided, the plurality of sensors 903 may be arranged at the same position or may be respectively arranged at different positions. If two sensors are used, for example, the one sensor may be arranged on the distal end portion 901*a* of the arm section 901, and the other sensor may be arranged within the housing 150.

In the present embodiment, the arm section 901 in the signal output device 10B directly contacts the drumhead of the bass drum, like in the above-described first embodiment and second embodiment. Accordingly, the sensor 903 can efficiently detect vibration transmitted to the arm section 901. In the signal output device 10B, the arm section 901 has an extension/retraction mechanism. Accordingly, if detection of vibration to be applied to the drumhead is not required, a user can easily separate the arm section 901 from the drumhead 815 without detaching the arm section 901 from the housing 150 by reducing the length of the arm section 901. Since the arm section 901 has the extension/retraction mechanism, the user can optionally change a contact position between the arm section 901 and the drumhead by extending and retracting the arm section 901. Accordingly, in the signal output device 10B according to the present embodiment, a degree of freedom is improved for the contact position between the arm section 901 and the drumhead.

In the signal output device 10B according to the present embodiment, a swinging mechanism may be provided in a connection portion between the arm section 901 and the housing 150. When the swinging mechanism is provided, a degree of freedom can be further improved for the contact position between the arm section 901 and the drumhead.

Although an example in which the arm section 901 has the telescopic extension/retraction mechanism has been described above, the extension/retraction mechanism of the arm section 901 in the present embodiment is not limited to one of a telescopic type. For example, the arm section 901 may be a telescopic winding-up cable. In this case, the sensor may be arranged within the housing or at a distal end of the cable directly contacting the drumhead of the bass drum.

Although the embodiment of the present invention has been described above, the present invention can be implemented in various forms, as described below. For example, in the above-described embodiment, the signal output device has transmitted to the control device a vibration signal corresponding to vibration transmitted to the arm section from the drumhead. However, a sound signal generation unit in the control device may be provided in the signal output device, The signal output device and the control device may be an integral housing.

In the above-described embodiments, an example in which the signal output device according to the present invention is attached to the bass drum in the drum set has been described. However, the signal output device according to the present invention may be attached to other parts (e.g., a hoop of a snare drum).

A configuration having another function can also be applied to the signal output device according to the present invention, For example, a sound pickup device that includes a microphone and collects a sound of a bass drum may be applied to the above-described signal output device.

Fourth Embodiment

Figure 11:
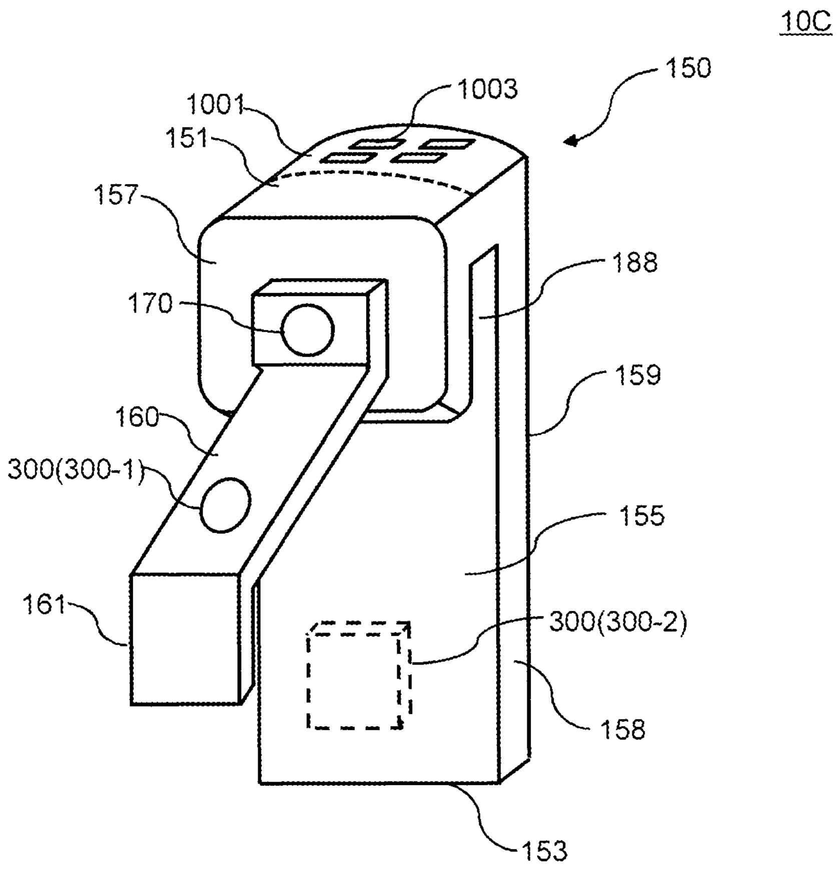
FIG. 11 is a perspective view of a signal output device according to a fourth embodiment of the present invention.
Figure 12:
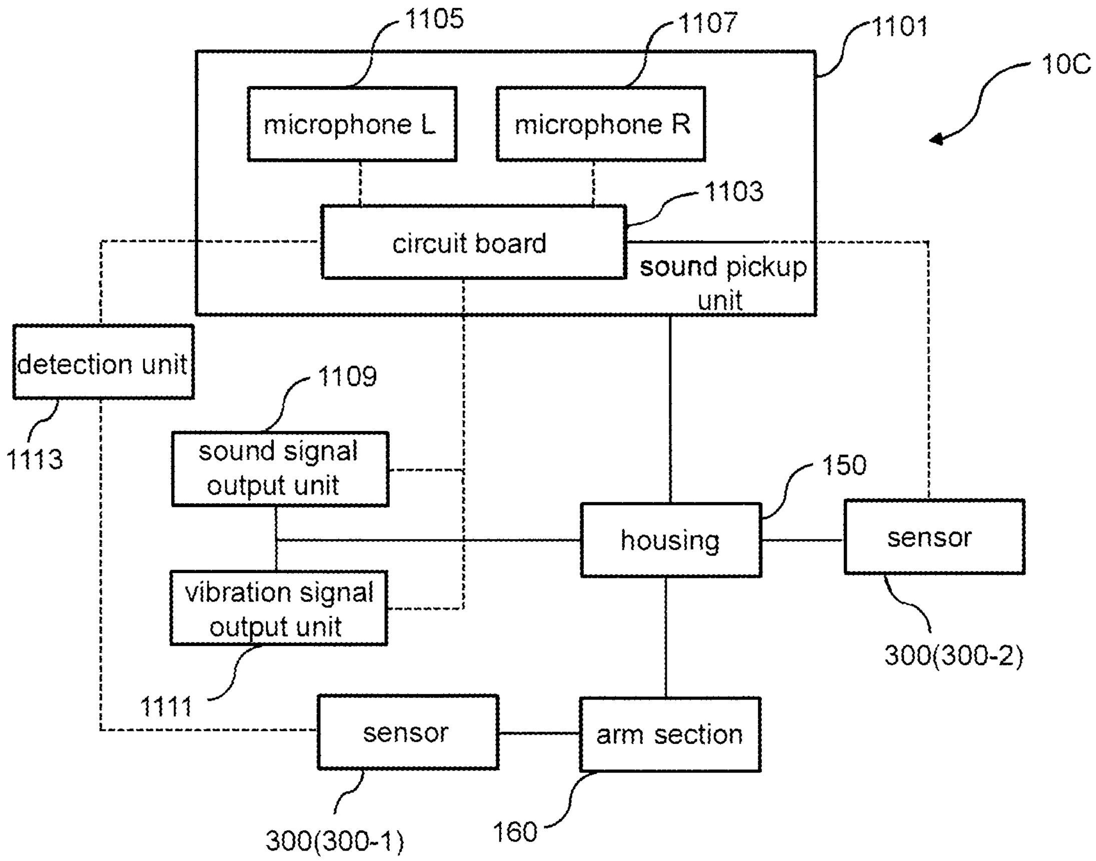
FIG. 12 is a block diagram illustrating a configuration of the signal output device according to the fourth embodiment of the present invention.

FIG. 11 is a perspective view of a signal output device 10C according to a fourth embodiment of the present invention. FIG. 12 is a block diagram illustrating a configuration of the signal output device 10C according to the fourth embodiment of the present invention illustrated in FIG. 11. In FIG. 12, a solid line for connecting blocks indicates a physical connection relationship, and a broken line for connecting the blocks indicates an electrical connection relationship. The signal output device 10C according to the present embodiment has substantially the same configuration as that of the signal output device 10 according to the first embodiment except that a sound pickup unit 1101 is provided within a housing 150. A different configuration from that of the signal output device 10 according to the first embodiment will be mainly described below, and detailed description is omitted for the same configuration as the configuration of the signal output device 10 according to the first embodiment.

As illustrated in FIG. 11, a microphone cover 1001 formed integrally with the housing 150 is arranged in an upper region 151 of the housing 150 of the signal output device 10C. The microphone cover 1001 may be formed separately from the housing 150. The microphone cover 1001 is provided with an opening section 1003 through which a sound is to pass. The signal output device 10C acquires a performance sound of a drum set in a place where it is installed, and outputs a sound signal corresponding to the acquired performance sound. The signal output device 10C acquires vibration of a bass drum 810, and outputs a vibration signal corresponding to the acquired vibration.

The microphone cover 1001 is a cover section that covers at least a part of a microphone L 1105 and a microphone R 1107, described below. In a state where the signal output device 10C is installed on the bass drum 810, the microphone cover 1001 is arranged on the side of the upper region 151 of the housing 150. The microphone cover 1001 may be arranged in a region other than the upper region 151.

The signal output device 10C according to the present embodiment includes an arm section 160 attached to the housing 150 and provided with a sensor 300 (300-1), the sound pickup unit 1101, a sound signal output unit 1109, a vibration signal output unit 1111, and a detection unit 1113. A configuration of the arm section 160 is similar to that of the arm section 160 in the signal output device 10 according to the first embodiment, and hence overlapping description is omitted.

The sound pickup unit 1101 is provided within the housing 150. The sound pickup unit 1101 includes a circuit board 1103, the microphone for left channel L 1105, and the microphone for right channel R 1107. Each of the microphone L 1105 and the microphone R 1107 has directivity and converts an input sound into an electrical signal and outputs the electrical signal. The circuit board 1103 includes an amplification circuit that amplifies signals respectively output from the microphone L 1105 and the microphone R 1107, and outputs the amplified signals as sound signals (two-channel stereo) to the sound signal output unit 1109. In the present embodiment, the microphone L 1105 and the microphone R 1107 are each an electret condenser microphone (ECM). Accordingly, the circuit board 1103 includes a power supply circuit that is supplied with power from an external device via the sound signal output unit 1109 and supplies the power to the microphone L 1105 and the microphone R 1107. The power may be supplied by a battery or the like. The number of microphones provided in the sound pickup unit 1101 may be one or three or more.

The signal output device 10C may include a sensor 300 (300-2) provided to the housing 150 in addition to the sensor 300 (300-1) provided on the arm section 160 extending from the housing 150, like the signal output device 10 according to the first embodiment. Although a case where the sensor 300 (300-2) is provided on an intermediate region 155 of the housing 150 is illustrated in FIG. 11, a position where the sensor 300 (300-2) is arranged is not limited to the intermediate region 155. The sensor 300 (300-2) may be arranged within the housing 150. When vibration occurs by a beat on a drumhead 815 of the bass drum 810 to which the signal output device 10C is attached, the vibration is transmitted to the housing 150. The sensor 300 (300-2) detects the vibration transmitted to the housing 150, and outputs a vibration signal representing the vibration. The sensor 300 (300-2) may detect the vibration transmitted to the housing 150 via the arm section 160.

The detection unit 1113 detects whether or not the sensor 300 (300-1) provided on the arm section 160 is electrically connected to the circuit board in the sound pickup unit 1101. The detection unit 1113 may judge whether or not the sensor 300 (300-1) is electrically connected to the circuit board in the sound pickup unit 1101 by detecting whether or not the arm section 160 is attached to the housing 150.

In the present embodiment, the circuit board 1103 includes an amplification circuit that amplifies the vibration signal output from the sensor 300 (300-1) or the sensor 300 (300-2), and outputs the amplified signal as a vibration signal to the vibration signal output unit 1111. The amplification circuit may be included in not the circuit board 1103 included in the sound pickup unit 1101 but another circuit board. In this case, the circuit board 1103 that processes a signal of the sensor 300 (300-2) may be connected to the housing 150. The circuit board 1103 outputs the vibration signal output from either one of the sensor 300 (300-1) and the sensor 300 (300-2). For example, the circuit board 1103 outputs the vibration signal output from the sensor 300 (300-1) when the detection unit 1113 detects that the sensor 300 (300-1) provided on the arm section 160 is electrically connected to the circuit board 1103 in the sound pickup unit 1101, and outputs the vibration signal output from the sensor 300 (300-2) when the sensor 300 (300-1) provided on the arm section 160 is not electrically connected to the circuit board 1103 in the sound pickup unit 1101. The amplification circuit that amplifies the vibration signal output from the sensor 300 (300-1) or the sensor 300 (300-2) may be omitted.

It has been described above that the circuit board 1103 outputs the vibration signal output from either one of the sensor 300 (300-1) and the sensor 300 (300-2). However, the circuit board 1103 may output the vibration signal output from at least one of the sensor 300 (300-1) and the sensor 300 (300-2). For example, the circuit board 1103 may output the vibration signals respectively output from both the sensor 300 (300-1) and the sensor 300 (300-2).

The sound signal output unit 1109 is a terminal connected to the housing 150, and an external device is connected thereto via a cable or the like. A sound signal output from the circuit board 1103 is fed to an external device (e.g., a control device 50A) connected to the sound signal output unit 1109. The vibration signal output unit 1111 is a terminal connected to the housing 150, and an external device is connected thereto via a cable or the like. A vibration signal output from the circuit board 1103 is fed to the external device (e.g., the control device 50A) connected to the vibration signal output unit 1111.

Figure 13:
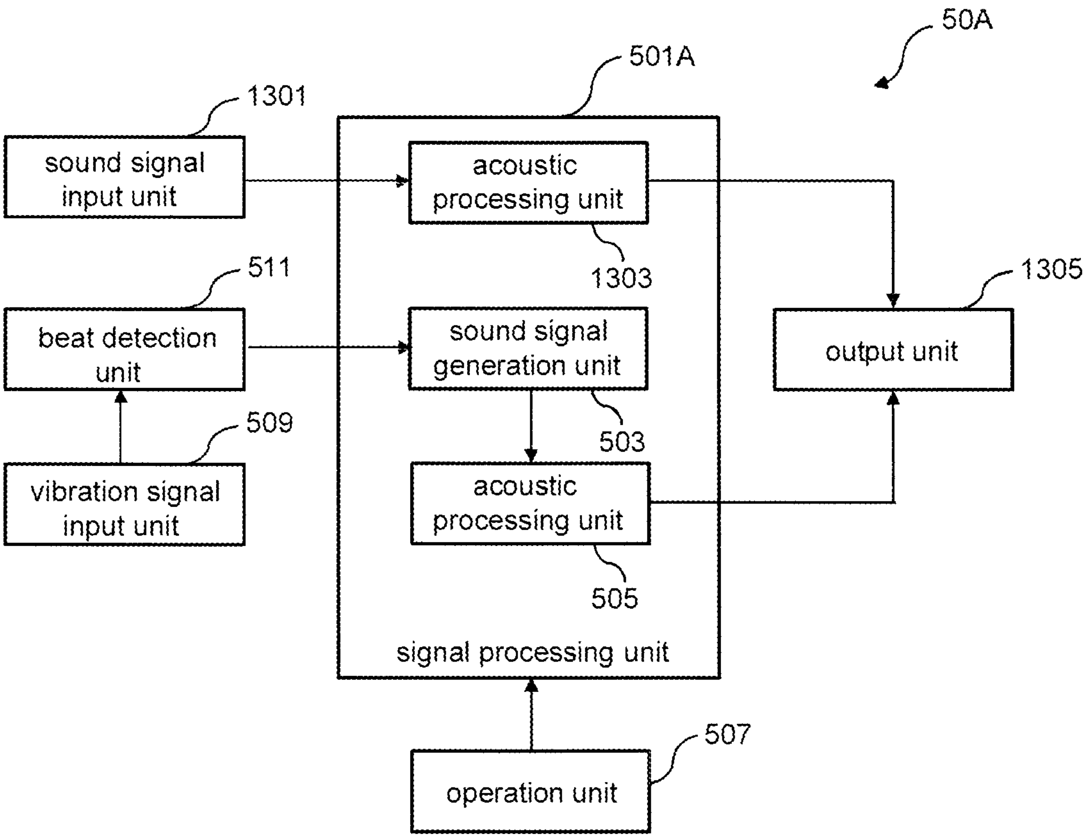
FIG. 13 is a block diagram illustrating a configuration of a control device in the fourth embodiment of the present invention.

The control device 50A is installed on a high hat stand, like the control device 50 illustrated in FIG. 1. The control device 50A acquires the sound signal and the vibration signal from the signal output device 10C, respectively, via the cables or the like. FIG. 13 is a block diagram illustrating a configuration of the control device 50A in the present embodiment. The control device 50A includes a signal processing unit 501A, an output unit 1305, an operation unit 507, a beat detection unit 511, a vibration signal input unit 509, and a sound signal input unit 1301. In the following, a different configuration from that of the control device 50 described in the first embodiment will be mainly described, and detailed description is omitted for the same configuration as the configuration of the control device 50.

The control device 50A detects the timing of a beat on the drumhead 815 of the bass drum 810 and the strength of the beat based on a vibration waveform represented by a vibration signal acquired from the signal output device 10C, and generates a beat signal representing the timing and the strength of the detected beat, like the control device 50. The control device 50A generates a sound signal based on the beat signal. Further, the control device 50A acquires the sound signal from the signal output device 10C and subjects the acquired sound signal to acoustic processing.

The sound signal input unit 1301 is a terminal to which the external device is connected via a cable or the like. In this example, the signal output device 10C is connected to the sound signal input unit 1301, and the sound signal output by the signal output device 10C is input to the sound signal input unit 1301. The sound signal input unit 1301 outputs the input sound signal to the signal processing unit 501A.

The signal processing unit 501A includes an acoustic processing unit 1303 that performs acoustic processing for the sound signal input from the sound signal input unit 1301 in addition to a sound signal generation unit 503 that generates a sound signal based on a beat signal and an acoustic processing unit 505 that performs acoustic processing for the sound signal generated in the sound signal generation unit 503.

The acoustic processing unit 1303 provides an acoustic effect (e.g., reverb, delay, distortion, or compressor) corresponding to a set parameter to the sound signal input from the sound signal input unit 1301 and outputs the sound signal. The parameter may be a previously determined value, or may be a value input via the operation unit 507. The acoustic processing unit 1303 differs from the acoustic processing unit 505 in a sound signal to which an acoustic effect is to be provided. Accordingly, the acoustic processing unit 1303 may provide acoustic processing different from the acoustic processing performed by the acoustic processing unit 505 to the sound signal. The same acoustic effect may be provided to the sound signal generated by the sound signal generation unit 503 and the sound signal input from the sound signal input unit 1301. If the same acoustic effect is provided, a configuration in which an acoustic effect is provided, after the sound signal from the sound signal input unit 1301 and the sound signal from the sound signal generation unit 503 are synthesized, to the synthesized sound signals (a configuration in which the acoustic processing units 505 and 1303 are integrated) may be used.

The output unit 1305 is a terminal to which the external device is connected via a cable or the like, and the external device is connected thereto via the cable or the like. The output unit 1305 synthesizes the sound signal output from the acoustic processing unit 505 and the sound signal output from the acoustic processing unit 1303 and outputs the synthesized sound signals.

If the signal output device 10C according to the present embodiment is installed at a previously assumed position of the drum set (here, on an upper part of the bass drum 810), respective sounds of each of drums and a cymbal can be picked up. For the sound of the bass drum 810, vibration is detected by the sensor 300 (300-1) or the sensor 300 (300-2). In the control device 50A, a sound signal corresponding to a sound of the bass drum, for example, is generated based on the vibration detected by the sensor 300 (300-1) or the sensor 300 (300-2). The control device 50A provides an acoustic effect to the generated sound signal and the sound signal acquired from the signal output device 10C and outputs the sound signals.

When a player listens to the sound signals output from the control device 50A with a headphone, a predetermined amount of a live sound in a performance of the drum set is cut off by the headphone. On the other hand, the player can listen to a performance sound collected by the signal output device 10C and a sound of the bass drum generated according to vibration of the bass drum 810 from the headphone.

What is claimed is:

1. A signal output device comprising:
a housing;
a fastener that attaches the housing to an object that includes a portion to be struck;
an arm section attached to the housing;
an extension section extending from the arm section and configured to contact the portion to be struck;
a first sensor, disposed on the arm section away from the extension section, that detects vibration transmitted to the arm section and outputs a vibration signal representing the vibration;
a second sensor provided on the housing and that detects vibration transmitted to the housing; and
an output terminal that outputs the vibration detected by at least one of the first sensor or the second sensor.

2. The signal output device according to claim 1, wherein the vibration transmitted to the housing is vibration transmitted through the arm section.

3. The signal output device according to claim 1, wherein the arm section is detachably attached to the housing.

4. The signal output device according to claim 1, wherein:
the arm section is configured to be rotatable with respect to the housing about a rotation axis, and
the extension section extends substantially at a right angle to the rotation axis.

5. The signal output device according to claim 1, wherein the arm section extends substantially parallel to the portion to be struck.

6. The signal output device according to claim 1, wherein the arm section is configured to be extendable and retractable with respect to the housing.

7. The signal output device according to claim 1, further comprising:
a sound pickup unit including a microphone,
wherein the output terminal further outputs a sound signal representing a sound input to the sound pickup unit.

8. The signal output device according to claim 1, wherein the arm section is configured to move the extension section away from the portion to be struck.

9. A signal output device comprising:
a housing;
a fastener that attaches the housing to an object that includes a portion to be struck;
an arm section attached to the housing and configured to be rotatable with respect to the housing about a rotation axis;
an extension section extending from the arm section and configured to contact the portion to be struck; and
a sensor, disposed on the arm section away from the extension section, that detects vibration transmitted to the arm section and outputs a vibration signal representing the vibration,
wherein the extension section extends substantially at a right angle to the rotation axis.

10. The signal output device according to claim 9, wherein the arm section is configured to be rotatable with respect to the housing to move the extension section away from and toward the portion to be struck.

11. A signal output device comprising:
a housing;
a fastener that attaches the housing to an object that includes a portion to be struck;
an arm section attached to the housing;
an extension section extending from the arm section and configured to contact the portion to be struck; and a first sensor, disposed on the arm section away from the extension section, that detects vibration transmitted to the arm section and outputs a vibration signal representing the vibration, wherein the arm section is configured to be extendable and retractable with respect to the housing.

12. The signal output device according to claim 11, further comprising a second sensor provided on the housing and that detects vibration transmitted to the housing; and an output terminal that outputs the vibration detected by at least one of the first sensor or the second sensor.

13. The signal output device according to claim 12, wherein the vibration transmitted to the housing is transmitted through the arm section.

14. The signal output device according to claim 11, wherein the arm section is configured to extendable with respect to the housing to cause the extension section to contact the portion to be struck and retractable with respect to the housing to cause the extension section to move away from the portion to be struck.

* * * * *